United States Patent [19]

Meyer et al.

[11] 4,376,608
[45] Mar. 15, 1983

[54] KINETIC EXTRUDER - A DRY PULVERIZED SOLID MATERIAL PUMP

[75] Inventors: John W. Meyer, Palo Alto; John H. Bonin, Sunnyvale; Arnold D. Daniel, Jr., Pleasanton, all of Calif.

[73] Assignee: Lockheed Missles & Space Company, Inc., Sunnyvale, Calif.

[21] Appl. No.: 188,047

[22] Filed: Sep. 17, 1980

Related U.S. Application Data

[63] Continuation-in-part of Ser. No. 32,646, Apr. 23, 1979, abandoned.

[51] Int. Cl.³ .............................................. F23D 11/06
[52] U.S. Cl. ................................. 414/217; 239/224
[58] Field of Search ................... 222/40, 64, 410; 406/71; 414/217, 301, 786; 239/71, 74, 112, 113, 223, 224, 681, 688; 134/166 R

[56] References Cited

U.S. PATENT DOCUMENTS

| | | | |
|---|---|---|---|
| 2,990,011 | 6/1961 | Stratford | 239/224 |
| 3,103,311 | 9/1963 | Kempf | 239/224 |
| 3,438,517 | 4/1969 | Steffen | 414/301 |
| 3,535,629 | 10/1970 | Gibson et al. | 222/64 |
| 3,583,413 | 6/1971 | Mertzanis | 134/166 R |
| 4,265,580 | 5/1981 | Meyer | 414/217 |

OTHER PUBLICATIONS

Lockheed Missles & Space Co., Inc., Coal Feeder Development Program, Phase II Report, Jul. 1977.

*Primary Examiner*—H. Grant Skaggs
*Attorney, Agent, or Firm*—H. Donald Volk

[57] ABSTRACT

Method and apparatus are shown for the continuous feeding of pulverized material to a high pressure container. A rotor is located within the high pressure container. The pulverized material is fed from a feed hopper through a stationary feed pipe to a vented spin-up chamber to a plurality of two-stage sprues mounted in the rotor. Control nozzles downstream from the sprues meter the flow of coal through the sprues.

14 Claims, 19 Drawing Figures

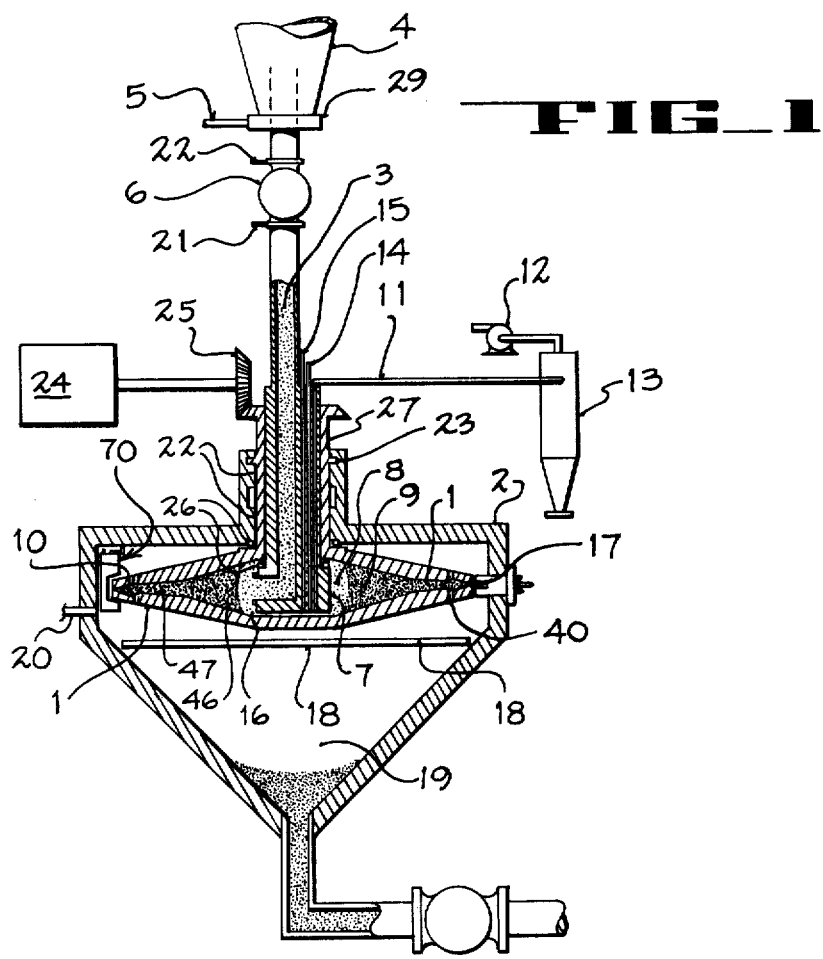
FIG_1
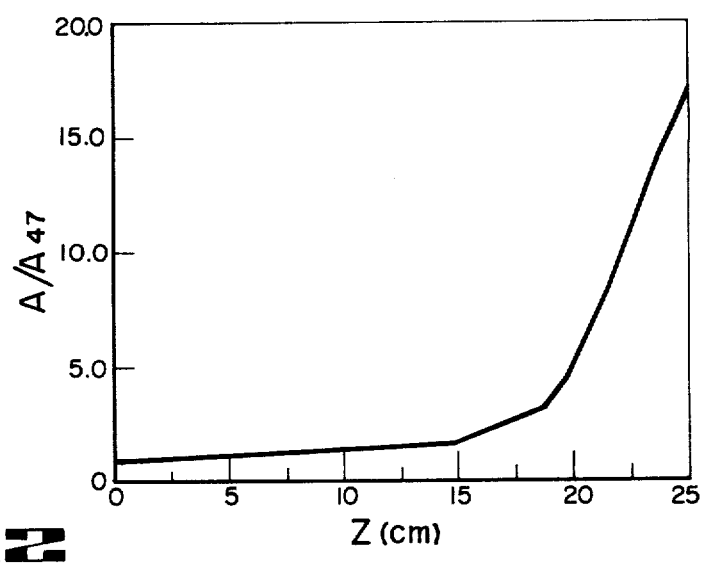
FIG_2

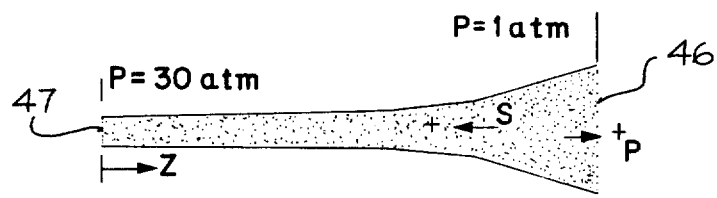
FIG_3
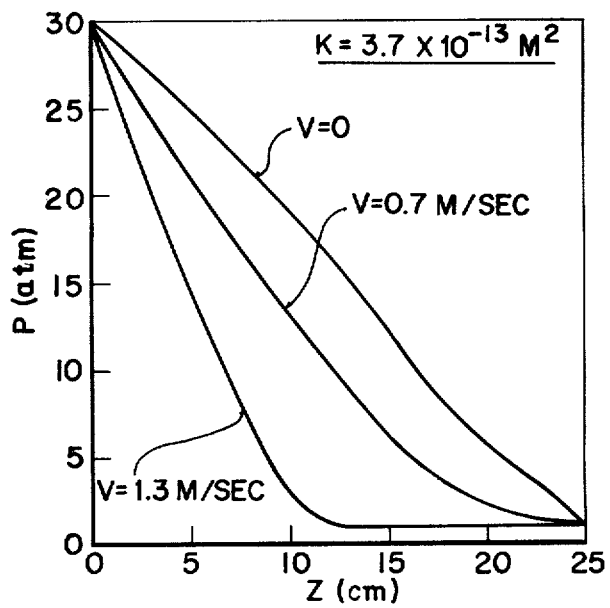
FIG_4
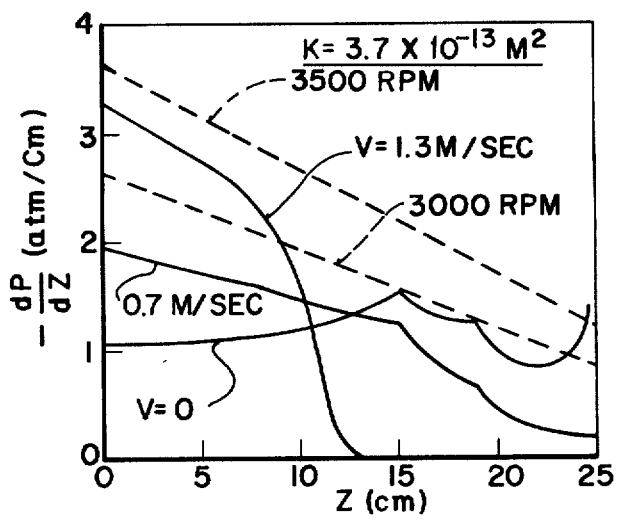
FIG_5

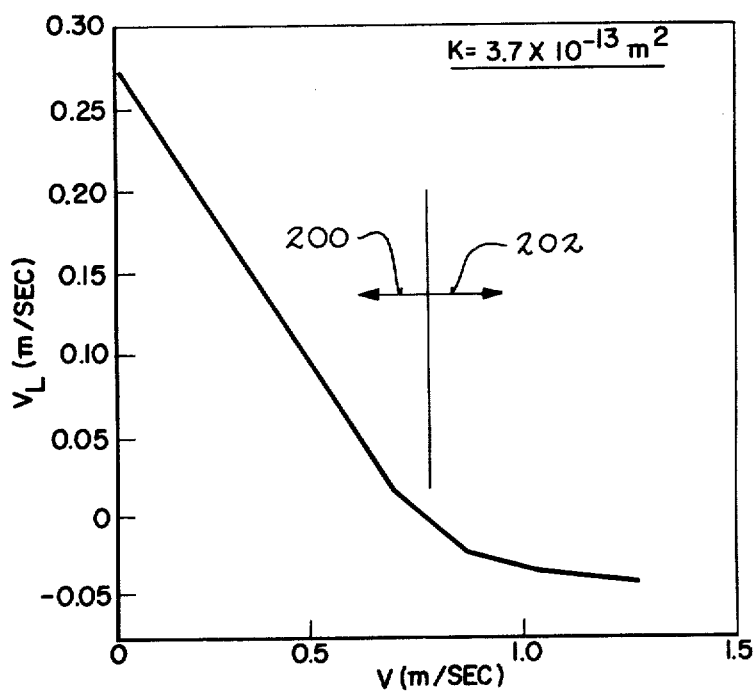
FIG_7
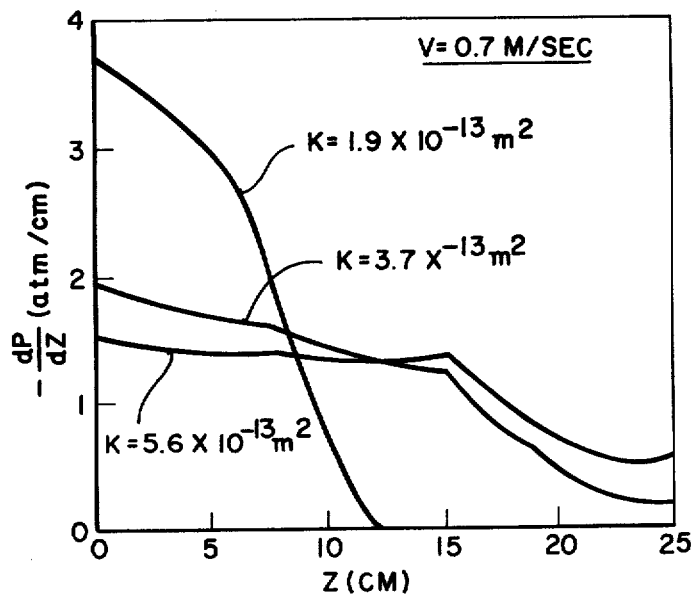
FIG_6

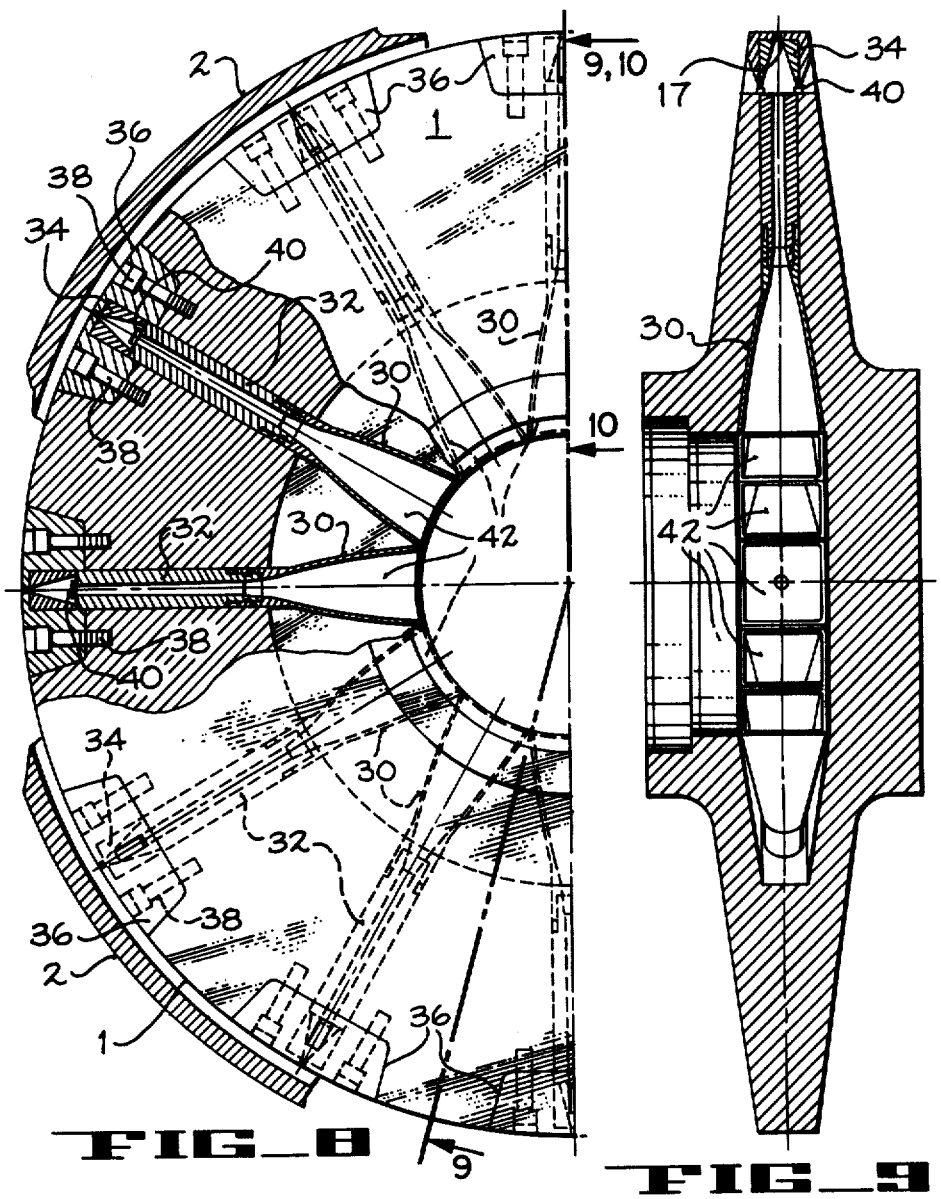

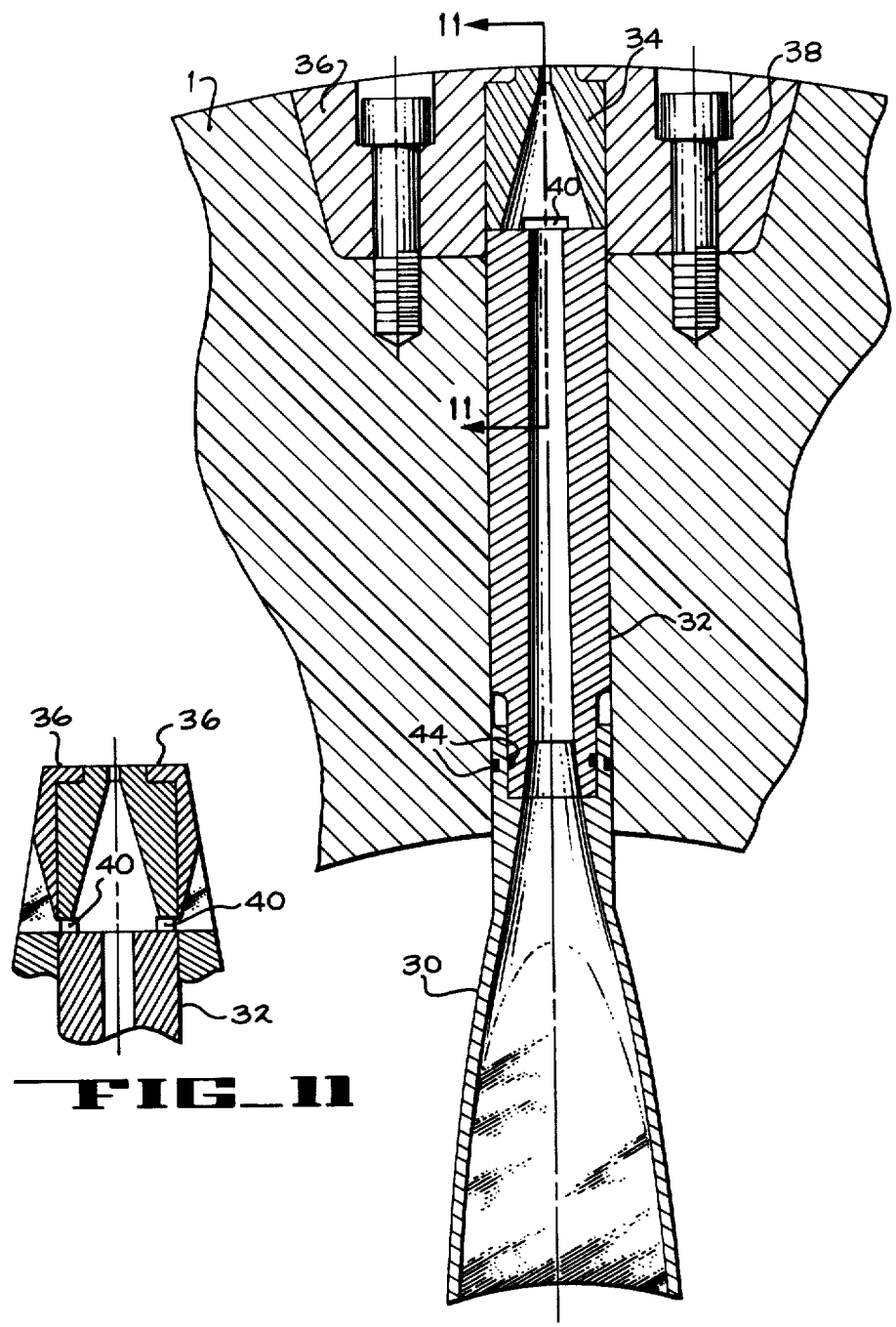
FIG_11
FIG_10

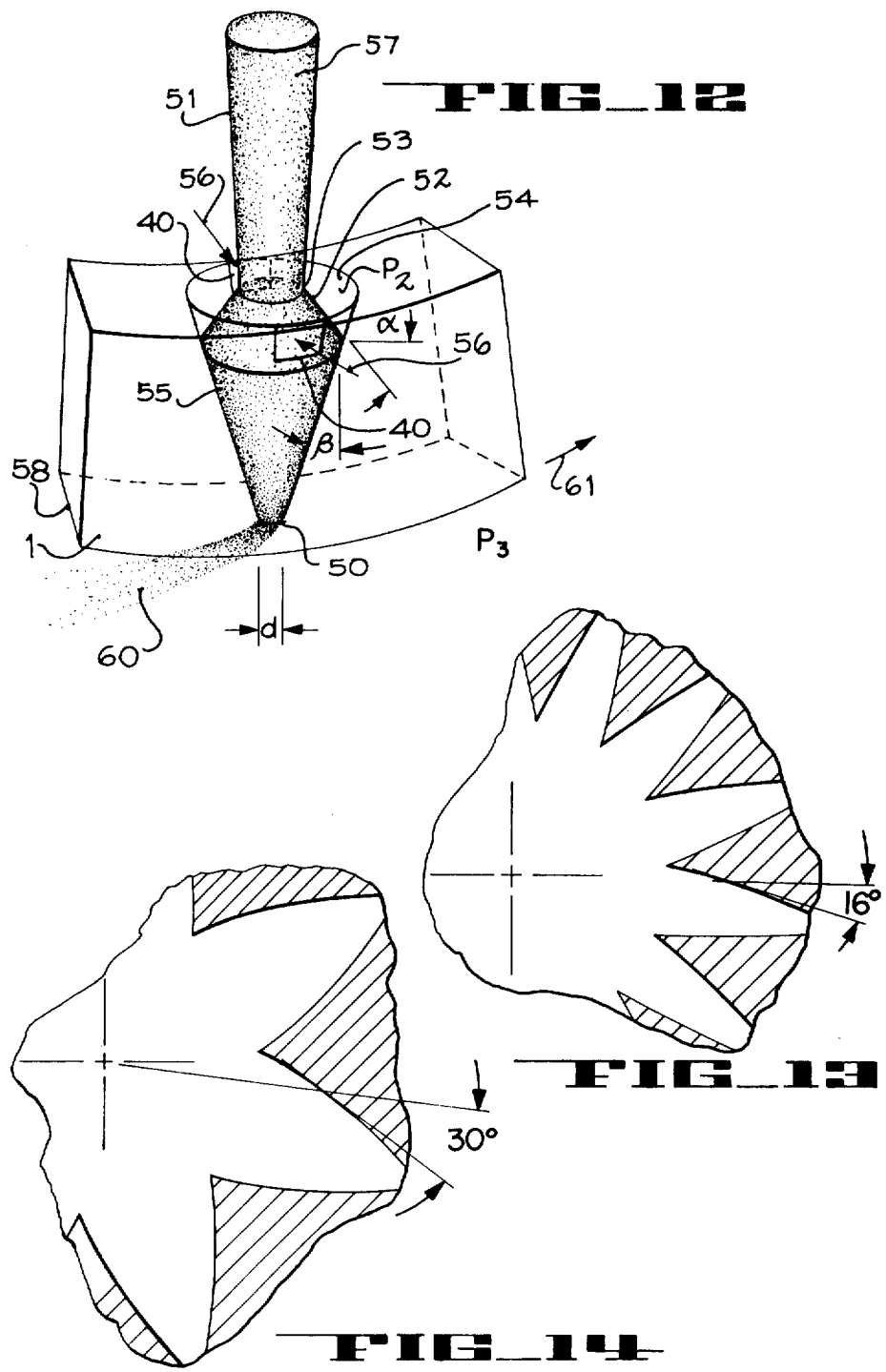

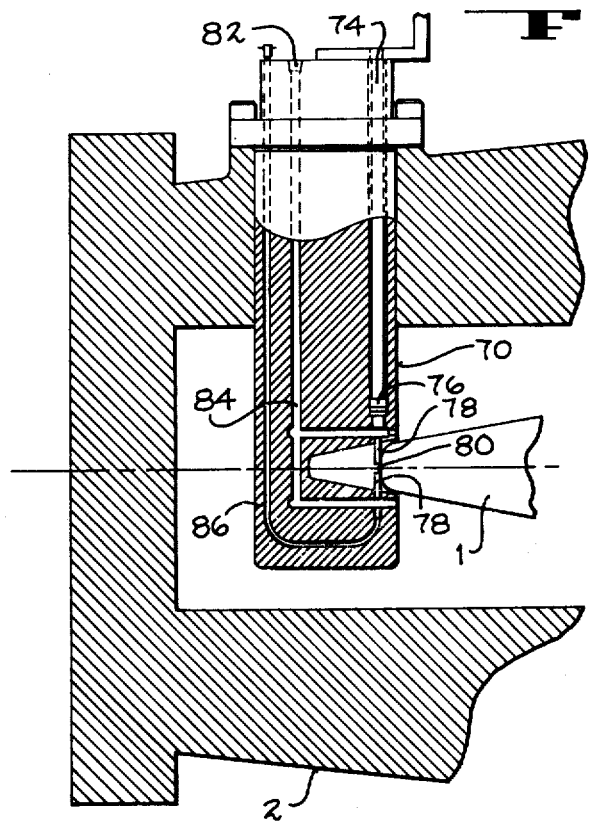
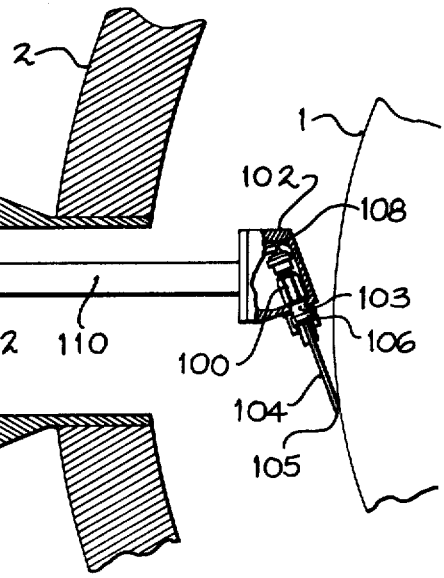

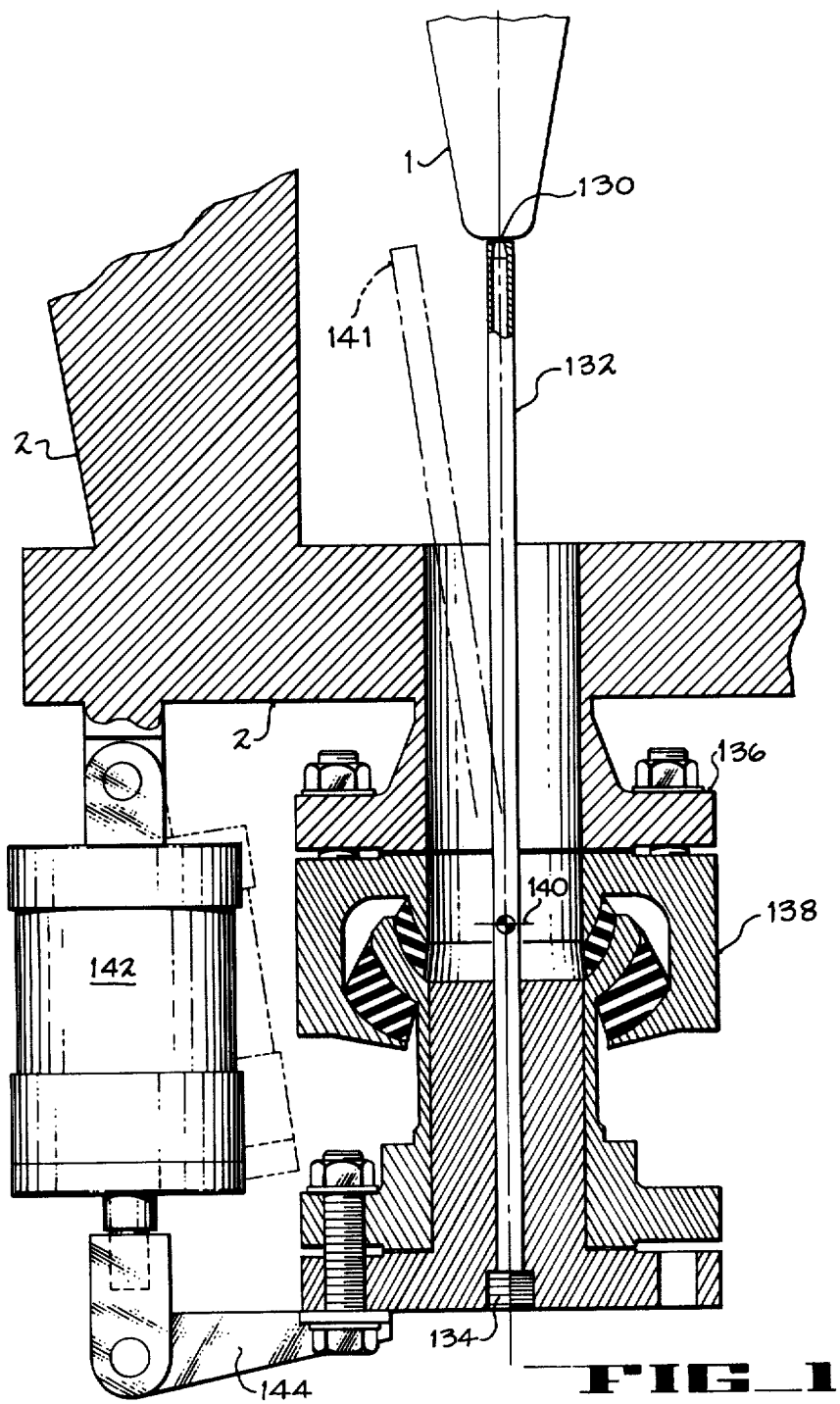
FIG_17

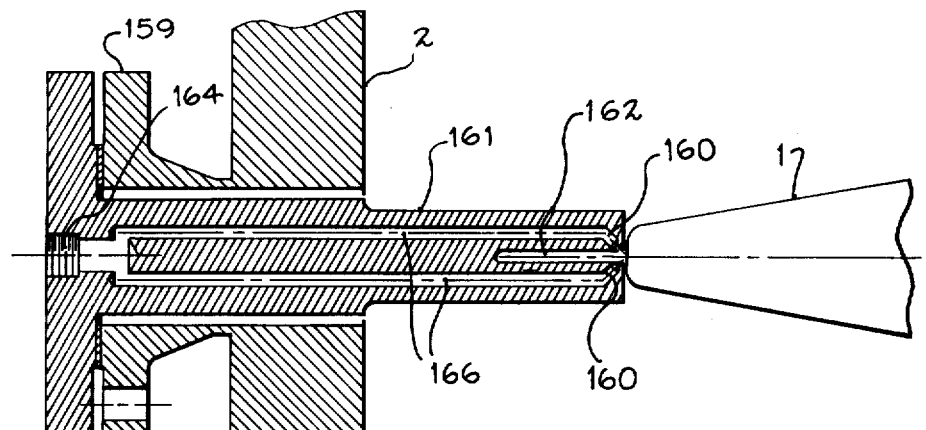
FIG_18
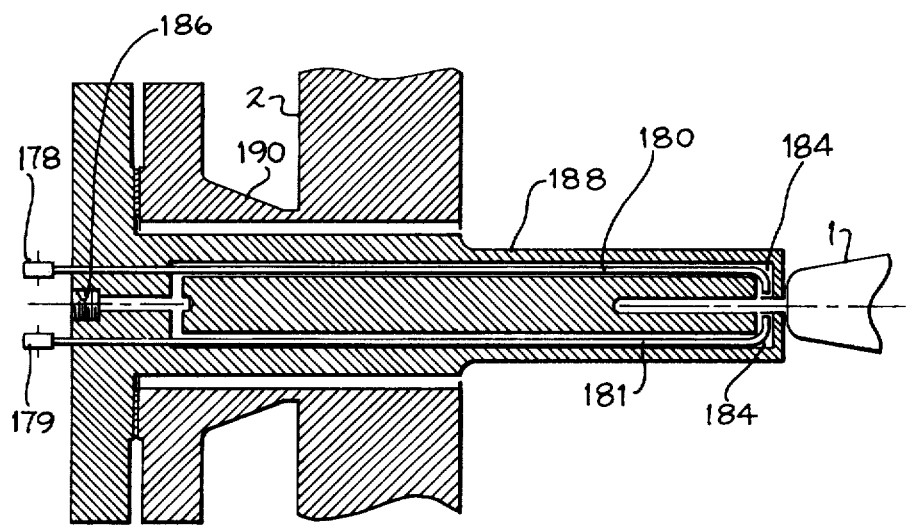
FIG_19

KINETIC EXTRUDER - A DRY PULVERIZED SOLID MATERIAL PUMP

The Government has rights in this invention pursuant to Contract No. EX-76-C-01-1792 awarded by the Department of Energy.

This is a continuation-in-part of application Ser. No. 32,646 filed Apr. 23, 1979 and now abandoned.

TECHNICAL FIELD

A number of industrial processes involving vessels which operate at elevated gas pressures require that solid material involved in the process be fed to them from a low or atmospheric pressure environment. One such industrial process, coal gasification, requires the feeding of pulverized or powdered coal to the elevated pressure reactor vessel from an atmospheric pressure hopper or the like. There are many types of coal gasification processes, utilizing a wide range of reactor pressure levels. The present invention is capable of continuously feeding pulverized coal from a one atmosphere environment to a 5 to 100 atmosphere environment.

BACKGROUND ART

The prior art in current use in this area is either the slurry feed method or the batch process feed method (commonly known as the lockhopper method). In the slurry feed method, a liquid-solid mixture is pumped into the pressure vessel using more or less conventional pumps. With this arrangement the liquid (usually water) required to transport the solid material may not be required in the process and therefore will reduce process efficiency or require considerable effort to be removed before processing can begin. The previous dry feeding arrangement, the batch process feed method, is to load the material into a hopper, close and pressurize the hopper with gas, and then dump the material into the pressure vessel. The hopper remains filled with high pressure gas which must be vented to prepare the hopper for loading the next batch of material. Such venting and batch feeding of material is not desirable. Large valves at the inlet and outlet of the hopper are required; such valves, operating cyclically in the environment of abrasive pulverized solids, have a poor effective life and reliability. Moreover, the pressurization gas contains suspended particles of the material and cannot be vented until it is processed to remove the suspended material.

Other prior art centrifugal device designs have been proposed for delivering dry pulverized coal to a high pressure chamber. Such prior art has many serious drawbacks. First, many of these prior art centrifugal devices (Staudinger U.S. Pat. No. 4,049,133, Duch U.S. Pat. No. 4,034,870, van der Burgt U.S. Pat. No. 4,120,410) reflected concern that the coal would form bridges and plug the rotor channels if it was allowed to compact. Therefore, there was an attempt to arrange for the material to remain in a fluidized state all the way through the rotor, as opposed to the compacted plug type flow in the present invention. Fluidized means that the material particles are separated by gas pressure forces so that there is little frictional stress between solid particles. Unfortunately, the fluidized flow of solids cannot be stabilized when pumping against a significant pressure. Furthermore, this attempt to avoid compaction and plugging was misguided. As is well known in the field of gravity flow of bulk (non-fluidized) solids, stable bridges or domes will not form if the dome span required is larger than a critical diameter, which is dependent on the bulk material properties. If the channel is smaller than the critical diameter, plugging can be expected. A typical 1g critical diameter for finely ground coal would be perhaps 10-20 cm. However, the key unrecognized fact is that the critical diameter is inversely proportional to the body force (i.e., g-force) acting on the material and consequently there is no serious plugging problem in even very narrow rotor channels. This can be shown from the mechanics of dome formation and is verified by experience. Thus, common experience with bin or hopper plugging problems with cohesive materials, which is obtained under 1 g gravity, is not a valid guide to flow or non-flow under several thousand g's which is typical of the present invention.

Also, none of the prior centrifugal device patents known to applicants have any structure which adequately stabilizes the flow of solids. Nor do they attempt any separation of the control of the flowrate, or metering, from the pressure sealing function. Most used some sort of spring loaded valve or flexible structure to attempt to control the efflux of coal from the rotor (Staudinger U.S. Pat. No. 4,049,133; Duch U.S. Pat. No. 4,034,870; Zellerhoff U.S. Pat. No. 3,182,825). Also, Duch U.S. Pat. No. 4,034,870 and van der Burgt U.S. Pat. No. 4,120,410 propose a cupped cymbal rotor structure where the efflux gap is a continuous slit around the rim and is adjustable by moving the two cups relative to one another. None of these prior structures successfully decouple the coal metering from the pressure sealing functions, which is of critical importance.

Applicants' preliminary analysis and experimental work preceding the development of the present invention is set forth in the Proceedings of the *Conference on Coal Feeder Systems*, published by the Jet Propulsion Laboratory, June 21 through 23, 1977, and the *Coal Feeder Development Program, Phase II Report*, FE-1792-34, dated July 1977 and approved for publication Oct. 31, 1977, Department of Energy, United States Government.

DISCLOSURE OF INVENTION

The present invention provides a method and apparatus for the continuous feeding of pulverized or powdered solid material to a pressurized container. This is achieved by the use of a rotor within the pressurized container through which the material is pumped into the container. The material is gas fluidized and pneumatically fed from an atmospheric feed hopper through a stationary feed pipe, then into a spin-up zone between a stationary inner hub and a rotatable driven rotor. Within the spin up zone the material is defluidized and compacted into a packed bed as it is centrifugally driven outward and enters radial channels or sprues in the rotor. A porous compacted moving plug of material forms in the sprues and creates a seal against the high-pressure gases. The sealing action is a combined effect of both the motion of the plug and its relatively low permeability. A control nozzle structure at the distal end of the sprues stabilizes the moving material plug and controls its outward velocity to the proper value for effective sealing.

The isobaric control nozzle structure is one of the key differences from prior art. The significant advance achieved by this structure relates to the successful separation of the pressure sealing function, which takes place in the sprue channel, from the flow metering function, which is mainly governed by the control nozzle outlet size. The diameter of the sprue channel can then be sized to optimize the sprue material velocity for the pressure sealing function. This sizing depends mainly on the permeability of the feedstock and the required mass flow rate. Typically, the sprue channel outlet diameter is much greater than the control nozzle outlet diameter. Ports communicating between the control nozzle interior and the area surrounding the rotor eliminate any gas pressure difference across the nozzle. This decouples its operation from the pressure sealing function. Without a separation of the sealing function from the metering function, which is accomplished by this sprue/control nozzle combination, the machine simply will not function.

The spin-up zone is vented to a vacuum system to allow the removal of excess fluidizing gas which is generated by the compaction of the solids and also any small amount of gas leakage back through the compacted moving plug in the sprues from the high pressure vessel. A subatmospheric pressure is maintained in the spin-up zone in order to assure reliable feed from an atmospheric hopper.

The transition to the sprues is shaped to reduce or eliminate any ledges where coal could agglomerate, and channel wall angles are everywhere less than the critical angle of slide of the material. Sprue lengths, areas, and area profiles are optimized for puming a particular feedstock at a particular back pressure and throughput. The sprues are constructed to be easily replaceable.

Flow sensors mounted near the rim of the rotor, separate from the rotor, monitor the effluxing coal streams in order to detect any plugging of the control nozzle outlets. A gas jet directed into the nozzle outlets is used to restart the flow should outlet plugging occur.

BRIEF DESCRIPTION OF DRAWINGS

FIG. 1 is a partial vertical sectional view, with portions shown diagrammatically, of a material pressurizing system embodying this invention for feeding pulverized or powdered material to a pressurized container.

FIG. 2 shows the sprue cross-sectional area profile used for the example calculations, where the cross sectional area ratio of the sprue is charted as a function of distance from the sprue outlet.

FIG. 3 is a drawing of the sprue containing moving solids in the same length scale as used in presenting the calculated results in FIGS. 4, 5 and 7, where the sprue dimension is charted as a function of distance from the space outlet.

FIG. 4 shows the calculated gas pressure distribution in the sprue solids plug interstices at different solids flow velocities for the example case.

FIG. 5 shows the calculated gas pressure gradient and centrifugal body force distributions in the sprue at different solids flow velocities for the example case.

FIG. 6 shows gas pressure gradient distributions in the sprue for various values of the sprue solids plug permeability.

FIG. 7 shows the calculated effect of solids flow velocity on gas leakage back through the sprue solids plug for the example case.

FIG. 8 shows a partial vertical view, with portions broken away, of the Kinetic Extruder Rotor showing the details of the sprue inlet configuration, the two sprue sections, the control nozzle structure, and the nozzle pressure equilization ports.

FIG. 9 gives a sectional view of the Kinetic Extruder Rotor of FIG. 8 showing the sprue entrance configuration.

FIG. 10 is an enlarged sectional view of one sprue, control nozzle, and nozzle block assembly shown in FIG. 8.

FIG. 11 is an enlarged sectional view of the control nozzle and nozzle block taken at right angle to the view of FIG. 10.

FIG. 12 is a schematic representation of the flowing solids inside the sprue control nozzle structure.

FIG. 13 shows the sprue entrance region configuration for a poorly flowing material such as coal with an angle of slide of 16°.

FIG. 14 shows the sprue entrance region configuration for a more free flowing material with an angle of slide of 30°.

FIG. 15 shows one embodiment of a sprue flow detector.

FIG. 16 shows a second embodiment of a sprue flow detector.

FIG. 17 shows details of a gas nozzle arrangement which can be activated to restart the solids flow through the rotor channels in the event plugging occurs at one of the control nozzle outlet holes.

FIG. 18 shows a second embodiment of a deplugger nozzle fixture.

FIG. 19 shows a second embodiment of the optical sprue flow detector fixture.

BEST MODE OF CARRYING OUT THE INVENTION

In FIG. 1 there is shown, for purposes of illustration, a partially schematic representation of a solids pressurizing system embodying the invention. The pressurized solids may be destined for some chemical process vessel, such as a coal gasification reactor. Coal gasification requires that the pressure within the reactor be maintained at elevated pressure, for example 30 atmosphere. Such pressures have made the feeding of coal to the process difficult and expensive.

In the illustrated embodiment, the feeder of our invention is a rotor 1 positioned within the pressurized rotor case 2. The exact configuration of the case is a matter of choice and design so long as the process gas pressure is maintained external to the rotor.

The material feeder of the present invention comprises a stationary feed pipe 3 for receiving material from a feed hopper 4. The feed hopper is fluidized in a conventional manner by a gas injection 5 from a gas supply connected to distribution plate 29 at the bottom of the feed hopper 4. A normally open valve 6 may be positioned between the feed hopper and the stationary feed pipe 3. The valve 6 is used only during startup and shutdown of the machine. The feed pipe 3 is equipped with purge taps 21 and 22 on either side of valve 6 to clear any entrapped solids from the pipe before startup and after shutdown. The material is fed through the feed pipe by gas fluidized solids feed, which is commonly known as "dense phase pneumatic transport flow".

The downstream end of the feed pipe comprises a non-rotating inner hub 7 and contains a right angle turn in the feed channel. Outward from the inner hub structure at the outlet end is an open annular zone termed the spin up zone 8. The right angle turn in the inner hub 7 allows the solid material to enter the spin-up zone 8 in a radial direction. The spin-up zone and the rest of the area surrounding the inner hub is also referred to as the "rotor eye" region.

The rotor 1 encloses the spin-up zone and inner hub and includes a number of radial flow channels each consisting of a sprue section 9 followed by a control nozzle section 10 with pressure equilization ports 40. The spin-up zone 8 comprises the annular space between the inner hub 7 and the entrance ends of the sprues. The sprue entrances are identified as 46 and the sprue outlets by 47 in FIG. 1.

The rotor is supported on shaft bearings 22 and thrust bearing 23 and driven by drive motor 24 via gears 25, or any other conventional drive means. The rotating seals 26 seal the rotor shaft 27 inside and outside the rotor. The gas pressure in the spin-up zone 8 is maintained at a lower gas pressure than the gas pressure in the feed hopper by vent tube 11, which is connected to a vacuum blower 12 or any other well-known means for maintaining low pressure through a dust filter 13. The suction typically maintains a pressure of about $-2$ psig to $-5$ psig ($-0.15$ to $-0.35$ bar gage) in the spin-up zone. This assures a continuous feed of material to the rotor from the atmospheric feed hopper.

The type of material flow through the feed pipe is dense phase pneumatic transport in comparison to the more common dilute phase pneumatic transport. For example, the material is fluidized but is maintained at a relatively high density, approximately 20 to 25 lbs/ft$^3$ (0.32 to 0.40 gms/cm$^3$). This type of feed allows for feeding large amounts of material with little transport gas and thereby minimizes the required diameter of the feed pipe. For example, in the nominal 1 Ton-Per-Hour Kinetic Extruder prototype, with a feed pipe of $\frac{3}{4}$" diameter, feed pipe mass fluxes of (0.3) to (0.6) tons per hour per square centimeter are used.

Within the spin-up zone, the coal is accelerated to the angular velocity of the rotor and compacted to a density of 40–50 lbs/ft$^3$ (0.64 to 0.80 gm/cm$^3$) before entering the sprues 9. The coal is nonfluidized in the sprues and flows therein as a compacted porous plug of granular solid material. The dot shaded areas indicate the portions of the machine which run filled with coal during feeding—light dot shading for lower density fluidized coal, (0.32 to 0.40 gm/cm$^3$), heavy dot shading for compacted coal (0.64 to 0.80 gm/cm$^3$).

The compaction process in the spin up zone produces gases which must be drawn out through vent 11 by the vacuum system in order to maintain the low pressure in the eye of the rotor. The quantity of gases produced amounts to approximately 1 standard cubic foot per minute (SC-FM) for a one ton per hour feed. Vent 11 also removes any gases leaking through the sprue plug from the high pressure region.

Additional secondary channels communicating with the rotor eye region via the inner hub are a pressure tap 14 and a flushing gas line 15. The pressure tap 14 is used to monitor the rotor eye pressure in order to warn of abnormal conditions and can be used to detect the loss of a solid plug in one of the sprues.

The flushing gas is a small gas flow into the rotor eye which assures the suction vent tube always has a minimum gas flow through it. Without this flow a relatively dense stream of solids can be drawn into the suction line under certain conditions, leading to a chance of plugging the vent tube. The flushing gas flow rate can either be a fixed quantity or it can be regulated according to the rotor eye pressure. The flushing gas supply system (not shown) can be of any conventional type.

The flushing gas line 15, vent tube 11, and the pressure tap 14 all communicate with the rotor eye region at points close to the rotational axis in the narrow gap (e.g., 3 mm) formed between the rotor and the nonrotating inner hub structure 7. Centrifugal action in this region limits solids entry into the vent tube 11.

The inner hub configuration allows for coal entry in the radial direction. This allows the solids feed into the rotor to be self regulating. The feed pipe is sized so that at the pressure drop maintained by the vacuum system the maximum rotor throughput can be comfortably supplied. The flow of material ino the rotor is then controlled by the choking of the feed pipe outlet by the complete filling of the spin up zone (8) up to the feed pipe outlet radial position (16). Faster or slower withdrawal of material through the sprues results automatically in greater or lesser feed of material into the rotor.

Coal exits the rotor through a plurality of control nozzle outlet holes 17 into the pressurized rotor case 2. Surrounding the rotor during operation is a dilute suspension of solids. A vortex is set up in the case by the spinning rotor and during feeding the solids rapidly drift radially outward and down through the slotted baffle 18, into an accumulator section 19 making up the lower portion of the case. The baffle 18 is designed to isolate the vortex set up by the rotor from the accumulator section. In the accumulator section 19 the solids are settled and transferred by a conventional pneumatic pick-up system, or other means, to a reactor or another high pressure hopper. Since essentially only coal enters the case through the rotor, while a mixture of both coal and gas leaves the accumulator section, pressurizing gas must be continuously applied to the case via port 20.

In FIG. 1 the general layout of the machine is a vertical, cantilever shaft rotor with both the material being fed and the power being applied from the top of the pressure case. However, a horizontal shaft rotor with the material being fed from one side and the power being applied by a drive shaft entry from the opposite side of the case has also been successfully operated. This horizontal shaft type of machine has certain mechanical advantages. From the standpoint of the invention, including the coal flow inside the rotor, there is essentially no difference between the two arrangements.

In order to enhance the understanding of the invention, the physics of the formation of the moving porous plug in the sprues will be explained.

It must be stressed that the Kinetic Extruder is for a dry, powdered or granular material feedstock. The flow physics for a powdered or granular material are different from the flow physics of a liquid material. Fundamentally, a liquid cannot support a shear stress without flow, while a granular material can. For example, a column of granular material, such as in a grain silo, does not exhibit a continuously increasing bulk solids stress or pseudo-pressure with depth as would a similarly sized column of liquid. A hydrostatic like stress distribution exists only a very few diameters below the bed surface in a granular material and thereafter the stress in the column remains constant regardless of depth, the column weight load being taken up by shear stresses on the containing walls. Furthermore, the stress distribution is little affected by whether or not the column is in motion or static. The stress in a granular material column may be computed from the well known Janssen's equation which expresses the asymptotic leveling of stress with depth. Similar column stress effects occur in the disclosed Kinetic Extruder sprues.

A distinction should be made between the bulk solids stess and the gas pressure in the interstitial pores between the grains of material. The gradient in gas pressure (i.e., the pressure change per unit length of sprue) represents the main force which must be overcome by centrifugal force to feed the material through the Kinetic Extruder sprues.

The main sprue channel design criteria for the present invention is a proper matching between the body force distribution and the gas pressure gradient distribution in the channel. As long as the body force exceeds the pressure gradient, keeping the bed stressed to some degree so the sprue plug maintains its integrity, the movement of the material will be stable. This requirement is virtually local in character because of the short effective distances over which solids bed stresses can build up. That is, due to the Jannsen effect the bed stresses cannot build up and push the sprue material through even a short local region where the gas pressure gradient exceeds the centrifugal body force.

A mathematical method for solving for the gas pressure distributions in the sprue channel has been developed. The basic governing equations describing the percolation of gases through the porous, moving, sprue material medium are Darcy's law, expressions of mass conservation for the flowing solid and the gas, and an equation of state for the gas. FIGS. 2 to 7 illustrate calculated results which highlight the important considerations for sprue channel design.

FIG. 2 shows the sprue cross-sectional area profile assumed for the example calculation. There is plotted the ratio of the local sprue area to the sprue outlet area, $A/A_{47}$ against the distance from the sprue outlet, Z. Other important variables are the sprue length, the pressure difference across the sprue, the solid material bed properties (bulk density, porosity, and permeability), the viscosity of the gas, and the velocity of the solids bed within the sprue. Results shown in FIGS. 3–7 correspond to the following values of these key parameters:

Sprue Length: 25 cm
Sprue Inlet Gas Pressure: 1 atm
Sprue Outlet Gas Pressure: 30 atm
Sprue Outlet Solids Velocity: 0 to 1.3 m/sec
Solids Bed Bulk Density: 0.67 gm/cm$^3$
Solids Bed Porosity: 0.50
Solids Bed Permeability, K: $3.7 \times 10^{-13}$m$^2$ (0.38 Darcys)
Gas Viscosity: $1.8 \times 10^{-5}$ nt-sec/m$^2$ The solids bed properties are characteristic of a 70%–200 mesh coal grind at the state of compaction typically occurring in the Kinetic Extruder sprues.

FIG. 3 shows a drawing of the sprue containing moving solids in the same length scale and orientation as used in plotting the calculated results in FIGS. 4, 5, and 7. In FIG. 3, the positive direction of solids motion is denoted by the arrow S and the positive direction of gas leakage motion is denoted by the arrow G. FIG. 4 shows the gas pressure, P, distribution in the sprue solids plug intersticies as a function of Z for several values of solids velocity through the sprue. The three curves shown correspond to sprue outlet solids velocities, V, of 0, 0.7 m/sec, and 1.3 m/sec. The sprue outlet solids velocity V is used here as the reference variable for the rate of solids flow through the sprue. It may be noted that because the sprue cross-sectional area decreases considerably from the inlet to the outlet end of the sprue, and the bed density is constant throughout, the local velocity of the solids is correspondingly lower toward the inlet (Z=25) end of the sprue. FIG. 4 shows clearly that the pressure distribution is sensitive to the flow velocity of the solids at the outlet. FIG. 5 gives the same results in terms of gas pressure gradient (dP/dz) distributions (i.e., pressure change per unit length of sprue). The solid lines in FIG. 5 represent the pressure gradient as a function of distance Z along the sprue. As discussed, the gradient in pressure comprises the opposing force which the centrifugal force must overcome. The formula showing that the centrifugal force must exceed the pressure gradient is expressed as $$jrw^2 > |dp/dz|$$

where
$jrw^2$ = centrifugal body force
j = bed density
r = distance from rotational axis
w = rotational speed.

Centrifugal force distributions in the sprue are shown as the dashed lines in FIG. 5 for rotor speeds of 3000 rpm and 3500 rpm. In these examples the rotational axis is assumed to be 13 cm from the sprue inlet. As shown in FIG. 5, higher solids velocity leads to higher pressure gradients at the outlet (Z=0) end of the sprue and accordingly higher rotational speeds would be required unless the optimum solids velocity is used. For example, an outlet solids velocity of 1.3 m/sec and a rotor speed of 3000 rpm would not be compatible since the pressure gradient near the sprue outlet exceeds the centrifugal force in the material at that point. In consequence, the sprue plug is unable to flow at this velocity. Attempts to operate under such conditions have been found to yield flow stoppages and blowbacks of high pressure gases into the rotor eye owing to the complete loss of the integrity of the sprue plug. On the other hand, as shown in FIG. 5, operating at an outlet velocity of 0.7 m/sec and 3000 rpm gives a stable situation. In design for a particular mass flow requirement, for example 1 ton/hr, the optimum sprue flow velocity can be accommodated by selection of the sprue outlet size (cross-sectional area) which yields this velocity.

FIG. 6 illustrates the effect of changes in the sprue solids plug permeability on the sprue pressure gradient distributions. For the calculations the solids throughput was fixed (outlet velocity, V=0.7 m/sec) and the permeability, K, was varied from $1.9 \times 10^{-13}$m$^2$ to $5.6 \times 10^{-13}$m$^2$. As shown in FIG. 6, decreasing permeability has a similar effect as increasing solids velocity. The key factor is the ratio of solids velocity to permeability. A low permeability feedstock requires a low solids velocity in the sprue. Conversely if the material is more permeable, higher velocities may be used while still maintaining favorable pressure gradient distributions and leakage characteristics. It is also found that the length of the sealing sprue plug plays a similar role, shorter plugs requiring higher solids velocities to produce zero leakage. Shorter sprues also mean higher average pressure gradients and therefore necessitate higher rotational speeds.

Finally, the sprue area ratio (inlet area/outlet area) and area profile may be varied. Since the gases expand in permeating through the sprue plug, compensating area changes are required. The FIG. 2 profile is a good choice for the example with a pressure ratio of 30.

Higher pressure ratios would typically require higher area ratios.

FIG. 7 illustrates the gas flow velocity $V_L$ through the porous bed in the sprue at the inlet end (i.e., into the spin-up region) as a function of the outflow velocity of the solids, V. It may be noted that there is a critical solids velocity (0.75 m/sec in this example) which yields no gas flow through the sprue in either direction. For a solids outlet velocity less than the critical value, indicated by arrow 200, some high pressure gases permeating through the sprue plug are able to reach the rotor eye. Above the critical solids velocity, (as denoted by arrow 202) no leakage occurs and some of the gas originally trapped in the bed pores passes through the sprue with the solids. If the feedstock properties, the key one being permeability, were known to have little or no variability, the critical solids velocity would be the optimum operating point. However, due to the variable feedstock properties it is best to design for operation with some minor net leakage into the rotor eye. This makes the machine less sensitive to feedstock properties fluctuations.

FIGS. 8, 9, 10 and 11 show additional details of the rotor construction. As shown, the sprues and the control nozzles are made as replaceable parts, with the sprues in two sections. This allows these parts, which are exposed to abrasive type wear, to be conveniently made from hard wear resistant materials. It also allows the rotor to be more easily reconfigured to accommodate changes in requirements—i.e., changes in required throughput, delivery pressure, or feedstock permeability. As shown in FIGS. 8 and 9 and in the sprue/control nozzle assembly detail drawings represented by FIGS. 10 and 11, the sprues 9 consist of a funnel section 30 in conjunction with sprue body sections 32. The control nozzles 10 are held against the distal end of the sprue body section by the nozzle retaining blocks 36 which are attached to the rotor 1 by screws 38. Pressure equalization ports 40 communicate between the control nozzle interior and the rotor exterior. O-rings seals 44 seal between the sprue sections and between the sprues and the rotor. In FIG. 9, it can be seen that the sprue inlets 42 have a rectangular shape so that they nestle together in such a way as to present maximum open area to the radial movement of the flowing coal.

FIG. 12 illustrates the functioning of the control nozzle. This shows a portion of the sprue channel 51, including its distal end 53 in conjunction with the control nozzle 55. The moving compacted solids 57 within the sprue channel and control nozzle are denoted by the shaded area. The control nozzle outlet 50 in the rotor rim 58 is the narrowest point in the flow channel and acts as the choke point for the moving plug of solids. The coal egressing from the sprue forms a cone shaped free surface 52 according to the material angle of repose, α, leaving a coal free, gas filled, space 54 above the solids. This space is connected to the rotor surroundings via a port or channel 40 so the gas pressure ($P_2$) within the control nozzle is substantially the same as the delivery pressure ($P_3$) due to gas inflow denoted by arrows 56. Under this condition (i.e., $P_2 = P_3$) it is found that the mass flow rate through the nozzle is only dependent on the nozzle outlet diameter, d, and the rotational speed or g-force, according to the equation:

$$m = Cd^{5/2}G^{\frac{1}{2}}$$

where m = nozzle mass flow rate (Kg/sec)
d = outlet diameter (cm)
G = Centrifugal acceleration (g's) = $rw^2/g$
r = rotor radius, w = rotor angular speed
C = empirical constant = 0.044 Kg/sec/$cm^{5/2}$ from tests with coal.

The function of the control nozzle is thus to meter the material flow and also to stabilize the flowing material plug in the sprue. Up to a certain limiting pressure, the control nozzle runs filled to the extent shown in FIG. 12 and the throughput is independent of delivery pressure, being only a function of rotor speed as given above. Under conditions where the centrifugal force is insufficient in comparison to the sprue pressure gradient, and the maximum mass flow which can be delivered by the sprue is less than m, the control nozzle "starves". That is, material is not supplied to the nozzle fast enough to maintain a back-up of material within the nozzle which extends to the distal end of the sprue. This lack of back-up of material removes the distal support to the material plug in the sprue. If this occurs, it has been found experimentally that the material plug in the sprue is unstable, and "blowbacks" of high pressure gases into the rotor due to a complete loss of the integrity of the sprue plug can be the result. The sprue instability situation is somewhat similar to a filled, inverted bottle, with the opening just beneath the surface of a pool of liquid. So long as the bottle opening is even slightly submerged, atmospheric pressure keeps the bottle filled. However, when the bottle is lifted out of the pool, the free liquid surface at the opening is unstable and the bottle empties in the familiar unsteady bubbling manner.

After exiting the nozzle outlet hole in the rotor rim, the solid material forms a plume 60 which is blown tangentially back along the rotor periphery due to the motion of the rotor 61 with respect to its gaseous environment. The radial velocity of the coal passing through the nozzle outlet is quite low in comparison to its tangential velocity which is the rim speed of the rotor (e.g., 40 ft/sec vs. 500 ft/sec).

FIGS. 13 and 14 show sections of the sprue entrance configurations for two example designs. They illustrate two particular requirements which must be met by the inlet region design. First, the wall surfaces along which the solid materials slides must be steep enough so that sliding does indeed take place. FIG. 13 shows sprue walls with constant angles of 16° with respect to the centrifugal body force vector. In the rotational field such constant angle walls are curved surfaces, as shown. The FIG. 13 example is suitable for a fairly poor flowing material such as coal. The use of straight sprue walls with a 16° slide angle at the inboard end would, of course, also assure material flow. However, it would then require a longer sprue channel to obtain the same area contraction and therefore this would be a less efficient design.

FIG. 14 shows a similar design for material which is more free flowing and has a less steep angle of slide (30° wall angle). For such a material, a smaller number of larger cross-section sprues could be used.

Another consideration is that the sprue inlets must be arranged to present a maximum percentage of open area to the flowing coal. In one embodiment of the invention the inlets are rectangular. If the inlets were round, for example, there would be considerable space between the flow channels where the coal could build up and extend into the spin up zone.

Such build ups are undesireable since they reduce the effective size of the spin up zone. Moreover, hardened lumps of coal may form, over time, which, should they become dislodged and enter the sprues, could plug the control nozzle outlets. Such lumps tend to often become dislodged during shut down of the machine when the coal feed is cut off and the rotor drains out of coal. By eliminating any places where coal may hang up, this problem is avoided.

FIGS. 15 and 16 show two types of sensor devices for monitoring the individual coal streams issuing from the rotor rim. One type detects the impact of the coal streams by means of a piezoelectric transducer mounted near the rotor rim. The other uses a light source and photodetector with the coal streams interrupting the light beam. The signals from either detectors may be displayed on an oscilloscope with the sweep exactly synchronized with the rotor revolutions by means of a conventional magnetic pickup and marker on the shaft or rotor (not shown). Individual sprue flows are readily identifiable on the display. It is found that at high rotor case pressure the individual coal streams only maintain their individuality out to a few millimeters from the rotor rim. The sensors must be placed at such distances in order to obtain good signals.

The sensor device shown in FIG. 15 consists of a sensor assembly 70 inserted through the rotor case 2 and juxtaposed to the rim of the rotor 1. A laser or other collimated light source (not shown) is attached to the bracket 72 so that the light beam passes into the inlet tube 74 and through the sealed glass window 76 into the pressurized environment of the rotor case. The light beam then passes through the small tubes 78 which are separated by the short gap 80. The gap 80 is immediately adjacent to the control nozzle effux holes in the rotor rim so that the effuxing coal streams interrupt the light beam as each hole passes. The light tubes 78 are purged continuously with clear gas which is introduced at port 82 and distributed to the light tubes via passage 84. Purging is utilized and the gap 80 is kept as short as practical, because the density of the suspension of coal surrounding the rotor severely attenuates the light.

After traversing gap 80, the beam passes through a fiber optics light guide 86. The beam is then conveyed via the fiber optic cable to any conventional means for converting the light to an electronic signal, such as a photodiode device (not shown).

FIG. 16 shows another embodiment of a sensor. This sensor is built around a conventional piezoelectric pressure or impact transducer 100. The transducer is protected from the high pressure suspension by the pressure housing 102 and seal 103. Coal emitted from the control nozzle outlet holes strikes the end of hardened rod 104. The impact point 105 is aligned with the nozzle outlet holes and positioned close to the rim of the rotor 1. The rod 104 is held in contact with the active face of the transducer 106 so the impact of the coal is detected. The sensor is mounted on hollow support bar 110 with the electrical signal cable 108 passing through the support bar. The sensor position is adjusted by means of rotation and translation of support bar 110. Once adjusted, the support is locked by means of clamp 112. The device is mounted on flange 114 which is attached to the pressure case 2 enclosing the rotor.

The monitoring equipment is used to detect any flow stoppages or partial flow stoppages of the coal streams. It has been found that the device shown in FIG. 17 can be used to restart the flow should a rotor outlet hole become plugged. This deplugger device consists of a small stationary gas nozzle which is directed toward the rim of the rotor. This is mounted close to the rotor rim so that the gas jet briefly strikes all of the control nozzle outlets in turn as each passes. Should an outlet hole become plugged, the gas jet is turned on and invariably restarts the flow almost instantaneously. The jet has no significant effect on the operating sprues, and no interruption of pumping is required.

In the embodiment of this flow restarting device shown in FIG. 17, the deplugger gas nozzle 130 is attached to gas conduit pipe 132 with the nozzle 130 outlet aligned with the control nozzle coal outlet holes in the rim of rotor 1. The gas is introduced at fitting 134 from a high pressure gas supply (not shown); the gas flow may be turned on and off by a solinoid valve or other conventional means. The deplugger device is mounted on flange 136 attached to the rotor case 2. A conventional flex joint 138 with pivot center 140, for example, the flex joint shown in U.S. Pat. Nos. 3,360,895 and 3,390,898, allows the deplugger nozzle to be swung to position 141 out of the path of the coal streams when not in use. This reduces abrasive wear on the nozzle. Flex joint movement is induced by pneumatic actuator 142 and linkage 144, or any other standard type of linear actuator.

FIG. 18 shows another embodiment of the flow restarting device. In this embodiment, a pair of gas nozzles 160 are used from which gas jets co-impinge on the coal efflux holes in the rim of the rotor 1. The fixture 161 contains the nozzles 160. The fixture 161 is slotted so that coal issuing from the rotor passes through the slot 162 instead of impinging directly on the fixture. This avoids erosive wear on the fixture. The device is mounted on a standard flange 159 attached to the pressure case. Gas is fed into the device at fitting 164 from a high pressure supply (not shown) as in the previous embodiment. The gas is conveyed to the nozzles 160 via channels 166.

FIG. 19 shows a second embodiment of the light beam coal flow monitoring device. In this device, light is introduced at one of the optical fiber cable connectors 178 from a standard type light source (not shown). The light passes down optical fiber cable 180, across gap 182, and thence into optical fiber cable 181. The light is modulated by the coal streams issuing from the rotor 1, as in the previous embodiment shown in FIG. 15. The modulated beam is conveyed through opposing optical cable 181 and connector 179 to a conventional means for converting the light to an electronic signal as in the previous embodiment. Annular channels 184 surround the ends of the optical fiber cables which define the gap 182. A purge gas flow through these channels keeps window ends of the optical fibers clean. The purge gas is introduced via fitting 186 from any conventional type gas supply (not shown). The sensor fixture 188 is mounted on a standard flange 190 to the pressure case 2. The fixture 190 is juxtaposed to the coal nozzle outlet holes in the rotor rim, as in the previously discussed embodiment.

Illustratively, a pulverized material feeding apparatus embodying this invention and having the following characteristics was operated:

Feedstock: Coal ground to 70% passing 200 mesh
Throughput: 1,000 Kg/H
Delivery Pressure: 28 atm
Rotor Diameter: 71 cm
Number of Sprues: 12

Sprue Length: 22 cm
Sprue Outlet Diameter: 0.72 cm
Control Nozzle Length: 3.8 cm
Control Nozzle Outlet Diameter: 0.21 cm
Rotor Speed: 3,600 rpm
Maximum Channel Wall Slide Angle: 16°
Suction Gas Flow: 3.5 SCFM Other modifications and advantageous applications of this invention will be apparent to those having ordinary skill in the art. Therefore, it is intended that the matter contained in the foregoing description and the accompanying drawings is illustrative and not limitative, the scope of the invention being defined by the appended claims.

We claim:

1. Apparatus for feeding a pulverized material from a supply source to a container against a pressure differential, said apparatus including a stationary feed pipe, said stationary feed pipe having an input end and an output end, said feed pipe adapted to feed pulverized material from the input end to the output end, said output end including at least one radially extending opening and defining an inner hub; a rotor, said rotor includes a plurality of radial sprues, each sprue including a proximal end and a distal end defining a passage for passage of said pulverized material, nozzle means cooperatively mounted at the distal end of each of said sprues for maintaining a stable plug of the pulverized material in said sprues and for controlling the flow of said material independent of the pressure in said container, said rotor rotatably mounted concentrically with respect to said inner hub of said stationary feed pipe and said rotor located so that the proximal ends of the sprues are juxtaposed to said inner hub, the space between proximal ends of the sprues and said inner hub forming a spin-up zone where said pulverized material emitting from said output end of said stationary feed pipe is accelerated before entering into said sprues of said rotating rotor, said nozzle means further defined as a fixed geometry nozzle having a relatively large opening cooperating with the distal end of said sprue and a smaller metering opening at the terminal end to control the flow of said material independent of the gas pressure in the said container at the terminal end immediately external to said rotor, said nozzle means including at least one port permitting gas pressure to equalize between the pulverized material within said nozzle structure and said container.

2. The apparatus for feeding a pulverized material as defined in claim 1, wherein each sprue includes a first and second section, said first and second section defining a passage having rectangular cross section shape at the proximal end of said first section to thereby substantially eliminate ledges on the proximal end of said rotor.

3. The apparatus for feeding a pulverized material, as defined in claim 2, wherein said first section of said plurality of sprues defines a passage having a relatively large cross sectional area reduction in the radial direction, and where said passage has a cross sectional area having a transition from a rectangular to a circular cross sectional shape.

4. The apparatus for feeding a pulverized material as defined in claim 1, including venting means to remove excess gas from the hub region.

5. The apparatus for feeding a pulverized material as defined in claim 4, wherein said venting means is adapted to maintain a pressure difference between said feed pipe and said spin up zone.

6. The apparatus for feeding a pulverized material as defined in claim 5, further defined as including means for spinning said rotor relative to said feed pipe and said inner hub.

7. The apparatus for feeding a pulverized material as defined in claim 1, further defined as including means for spinning said rotor relative to said feed pipe.

8. The apparatus for feeding a pulverized material as defined in claim 1, wherein said stationary feed pipe is further defined as including a secondary channel and a venting means, said venting means connected to said secondary channel for removing gas from the spin up region.

9. The apparatus for feeding a pulverized material as defined in claim 8, wherein said venting means is adapted to maintain the pressure at said spin up zone at a lower pressure than the pressure at said supply source.

10. The apparatus for feeding a pulverized material as defined in claim 8, wherein said secondary channel communicates with said spin-up zone by way of narrow gap disposed between the end of said inner hub and said rotor.

11. The apparatus for feeding a pulverized material as defined in claim 8, wherein said stationary feed pipe is further defined as including a third channel for injecting gas into said spin-up region.

12. Apparatus for feeding a pulverized material from a supply source to a housing maintained at elevated pressure, said apparatus including a rotor disposed in said housing and a feed means, said rotor operably connected to the feed means for receiving the pulverized material and discharging it within the housing, said rotor including a first means for forming a plug of the material, said first means having a material inlet and outlet, and said rotor including a second means for controlling the flow of material through said rotor, said second means spaced from the outlet of the first means and substantially in alignment therewith, said second means including an isobaric control nozzle having a fixed geometry, said control nozzle sized to control the flow of said material through said rotor and through said apparatus, said control nozzle further defined as including at least one fixed port communicating with the interior of said housing for maintaining the junction between said first and second means at the same pressure as the pressure in said housing.

13. The apparatus for feeding a pulverized material as described in claim 12, wherein the outlet of said control nozzle is substantially smaller than the output of said plug forming means.

14. The apparatus for feeding a pulverized material as described in claim 13, wherein the cross-sectional area of the outlet of said plug-forming means is substantially three times the cross-sectional area of the output of said control nozzle.

* * * * *